US012700891B2

(12) United States Patent　　　(10) Patent No.:　US 12,700,891 B2
Calciu et al.　　　　　　　　　　(45) Date of Patent:　　Aug. 4, 2026

(54) TUNNING HIGH SPEED LINK PARAMETERS

(71) Applicant: Lenovo Global Technology (United States) Inc., Morrisville, NC (US)

(72) Inventors: Corneliu-Ilie Calciu, Bucharest (RO); Catalin Nitipir, Bucharest (RO); Radu Mihai Iorga, Bucharest (RO); George-Andrei Stanescu, Ilfov (RO)

(73) Assignee: Lenovo Global Technology (United States) Inc., Morrisville, NC (US)

( * ) Notice: Subject to any disclaimer, the term of this patent is extended or adjusted under 35 U.S.C. 154(b) by 135 days.

(21) Appl. No.: 18/896,563

(22) Filed: Sep. 25, 2024

(65) Prior Publication Data

US 2025/0015834 A1　　Jan. 9, 2025

Related U.S. Application Data

(63) Continuation of application No. 17/667,396, filed on Feb. 8, 2022, now Pat. No. 12,136,962.

(51) Int. Cl.
*H04B 1/06*　　　(2006.01)
*H04B 3/06*　　　(2006.01)
*H04B 3/46*　　　(2015.01)

(52) U.S. Cl.
CPC ................. *H04B 3/06* (2013.01); *H04B 3/46* (2013.01)

(58) Field of Classification Search
CPC ... H04B 1/06; H04B 3/46; H04B 3/06; H04B 1/1027; H04B 1/1036; H04B 1/109; H04B 10/07; H04L 1/20

USPC ............. 333/12, 13, 14, 15, 16, 17.1, 18, 20
See application file for complete search history.

(56) References Cited

U.S. PATENT DOCUMENTS

| | | | |
|---|---|---|---|
| 9,544,864 B1 | 1/2017 | Takahashi | |
| 9,933,984 B1 * | 4/2018 | Biagiotti | .............. G01R 13/029 |
| 12,136,962 B2 * | 11/2024 | Calciu | ..................... H04B 3/06 |
| 12,566,656 B2 * | 3/2026 | Khayrallah | ........... G06F 11/079 |

OTHER PUBLICATIONS

U.S. Appl. No. 17/667,396, filed Feb. 8, 2022, Notice of Allowance, pp. 1-11.

* cited by examiner

*Primary Examiner* — Hai L Nguyen
(74) *Attorney, Agent, or Firm* — Kunzler Needham & Hilton; Bruce R. Needham

(57) ABSTRACT

A method for tunning high speed link parameters for cables with a transceiver at each end includes receiving, at a second computing device, a waveform with an eye pattern transmitted from a first computing device connected to the second computing device with a cable. The received waveform is in response to the first computing device transmitting an eye pattern bit sequence after establishing a communication link between the first and second computing devices. The method includes determining a bit error rate ("BER") from the received waveform, comparing the received waveform with an optimal eye pattern, deriving quality information from the comparison of the received waveform with the optimal eye pattern and the determined BER, and transmitting an eye pattern quality message to the first computing device. The eye pattern quality message includes the quality information. The first computing device adjusts transmission parameters and retransmits an eye pattern bit sequence.

20 Claims, 8 Drawing Sheets

200

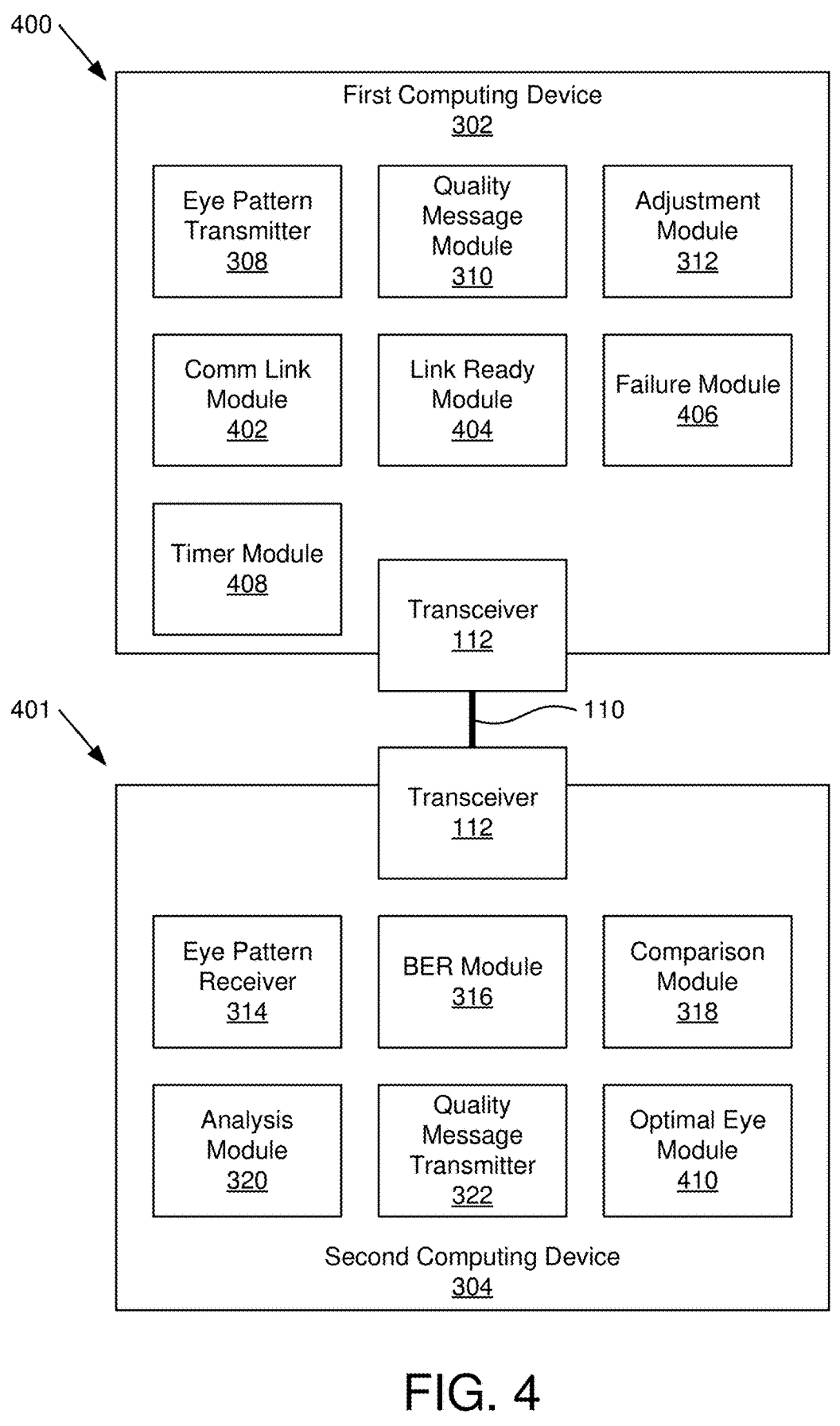

400

First Computing Device
302

| Eye Pattern Transmitter 308 | Quality Message Module 310 | Adjustment Module 312 |
|---|---|---|
| Comm Link Module 402 | Link Ready Module 404 | Failure Module 406 |
| Timer Module 408 | Transceiver 112 | |

110

401

Transceiver
112

| Eye Pattern Receiver 314 | BER Module 316 | Comparison Module 318 |
|---|---|---|
| Analysis Module 320 | Quality Message Transmitter 322 | Optimal Eye Module 410 |

Second Computing Device
304

FIG. 4

TUNNING HIGH SPEED LINK PARAMETERS

CROSS-REFERENCE TO RELATED APPLICATIONS

This is a continuation application of and claims priority to U.S. patent application Ser. No. 17/667,396 entitled "TUNNING HIGH SPEED LINK PARAMETERS" and filed on Feb. 8, 2022 for Corneliu-Ilie Calciu et al., which is incorporated herein by reference for all purposes.

FIELD

The subject matter disclosed herein relates to tuning transmission parameters and more particularly relates to tunning high speed link parameters for cables with a transceiver at each end.

BACKGROUND

Today datacenter computer networks are using a variety of Ethernet technology starting from the low speed 1 giga bit-per-second ("Gbps) Base T up to the new 100 Gbps Base or higher. Many deployments are using 10 Gbps links without auto-negotiation since this technology is a cost-effective solution. Many deployments with 25 Gbps links without auto-negotiation are used to handle the vendors interoperability issues.

BRIEF SUMMARY

A method for tunning high speed link parameters for cables with a transceiver at each end includes transmitting, in response to establishing a link, an eye pattern bit sequence from a first computing device to a second computing device over a cable with a transceiver connected to each end of the cable. Establishing the link includes establishing a communication link over the cable between the first computing device and the second computing device. The method includes receiving an eye pattern quality message from the second computing device using a device discovery protocol. The eye pattern quality message includes quality information of a received waveform corresponding to the transmitted eye pattern bit sequence. The method includes adjusting transmission parameters for transmission over the cable in response to the quality information, and retransmitting the eye pattern bit sequence using the adjusted transmission parameters.

A method for determining quality information, at a computing device, of a waveform with an eye pattern includes receiving, at a second computing device, a waveform with an eye pattern transmitted from a first computing device. The first computing device is connected to the second computing device with a cable with a transceiver at each end of the cable. The received waveform is in response to the first computing device transmitting an eye pattern bit sequence in response to establishing a communication link between the first and second computing devices. The method includes determining a BER from the received waveform, comparing the received waveform with an optimal eye pattern, deriving quality information from the comparison of the received waveform with the optimal eye pattern and the determined BER, and transmitting an eye pattern quality message to the first computing device using a device discovery protocol. The eye pattern quality message includes the quality information and the first computing device adjusts transmission parameters in response to the eye pattern quality message and retransmits an eye pattern bit sequence to the second computing device.

An apparatus for tunning high speed link parameters for cables with a transceiver at each end includes an eye pattern transmitter configured to transmit, in response to establishing a link, an eye pattern bit sequence from a first computing device to a second computing device over a cable with a transceiver connected to each end of the cable. Establishing the link includes a communication link module establishing a communication link over the cable between the first computing device and the second computing device. The apparatus includes a quality message module configured to receive an eye pattern quality message from the second computing device using a device discovery protocol. The eye pattern quality message includes quality information of a received waveform corresponding to the transmitted eye pattern bit sequence. The apparatus includes an adjustment module configured to adjust transmission parameters for transmission over the cable in response to the quality information, and the eye pattern transmitter is further configured to retransmit the eye pattern bit sequence using the adjusted transmission parameters. The quality message module continues to receive eye pattern quality messages, the adjustment module continues to adjust the transmission parameters from quality information from a most recently received eye pattern quality message, and the eye pattern transmission continues to retransmit the eye pattern bit sequence using the adjusted transmission parameters until a received eye pattern quality message indicates that a received eye pattern is within an acceptable tolerance of an optimal eye pattern.

Another apparatus for tunning high speed link parameters for cables with a transceiver at each end includes an eye pattern receiver configured to receive, at a second computing device, a waveform that includes an eye pattern transmitted from a first computing device. The first computing device is connected to the second computing device with a cable that includes a transceiver at each end of the cable. The received waveform is in response to the first computing device transmitting an eye pattern bit sequence in response to establishing a communication link between the first and second computing devices. The apparatus includes a BER module configured to determine a BER from the received waveform, a comparison module configured to compare the received waveform with an optimal eye pattern, an analysis module configured to derive quality information from the comparison of the received waveform with the optimal eye pattern and the determined BER, and a quality message transmitter configure to transmit an eye pattern quality message to the first computing device using a device discovery protocol. The eye pattern quality message includes the quality information and the first computing device adjusts transmission parameters in response to the eye pattern quality message and retransmits an eye pattern bit sequence to the second computing device.

A system for tunning high speed link parameters. The system includes a first computing device, a second computing device, and a cable between the first computing device and the second computing device with a transceiver at each end. The system includes an eye pattern transmitter configured to transmit, in response to establishing a link, an eye pattern bit sequence from the first computing device to the second computing device over the cable. Establishing the link includes a communication link module establishing a communication link over the cable between the first computing device and the second computing device. The system includes an eye pattern receiver configured to receive, at the second computing device, a waveform that includes the eye pattern bit sequence transmitted from the first computing device, a BER module configured to determine a bit error rate ("BER") from the received waveform, a comparison module configured to compare the received waveform with an optimal eye pattern, an analysis module configured to derive quality information from the comparison of the received waveform with the optimal eye pattern and the determined BER, and a quality message transmitter config-ure to transmit an eye pattern quality message to the first computing device using a device discovery protocol, the eye pattern quality message comprising the quality information.

The system includes a quality message module configured to receive the eye pattern quality message from the second computing device using a device discovery protocol, an adjustment module configured to adjust transmission param-eters for transmission over the cable in response to the quality information, and the eye pattern transmitter is further configured to retransmit the eye pattern bit sequence using the adjusted transmission parameters. The quality message module continues to receive eye pattern quality messages, the adjustment module continues to adjust the transmission parameters from quality information from a most recently received eye pattern quality message, and the eye pattern transmission continues to retransmit the eye pattern bit sequence using the adjusted transmission parameters until a received eye pattern quality message indicates that a received eye pattern is within an acceptable tolerance of an optimal eye pattern.

BRIEF DESCRIPTION OF THE DRAWINGS

A more particular description of the embodiments briefly described above will be rendered by reference to specific embodiments that are illustrated in the appended drawings. Understanding that these drawings depict only some embodiments and are not therefore to be considered to be limiting of scope, the embodiments will be described and explained with additional specificity and detail through the use of the accompanying drawings, in which:

FIG. 4 is a schematic block diagram illustrating another first apparatus in a first computing device and another second apparatus in a second computing device where the first and second computing devices are connected with a cable with a transceiver at each end, according to various embodiments;

DETAILED DESCRIPTION

Figure 1:
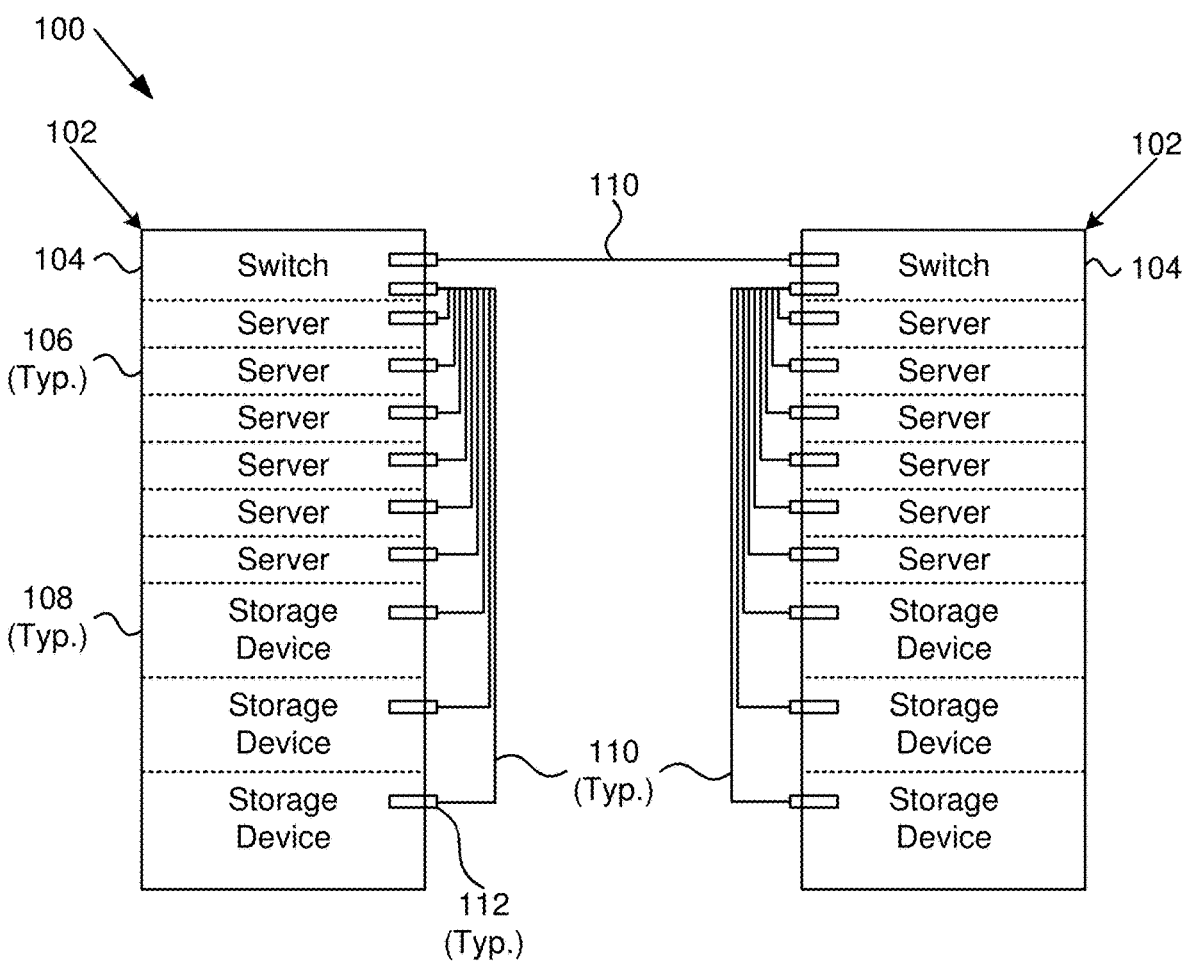
FIG. 1 is a schematic block diagram illustrating computer equipment racks with cables each with a transceiver at each end, according to various embodiments.

As will be appreciated by one skilled in the art, aspects of the embodiments may be embodied as a system, method or program product. Accordingly, embodiments may take the form of an entirely hardware embodiment, an entirely soft-ware embodiment (including firmware, resident software, micro-code, etc.) or an embodiment combining software and hardware aspects that may all generally be referred to herein as a "circuit," "module" or "system." Furthermore, embodi-ments may take the form of a program product embodied in one or more computer readable storage devices storing machine readable code, computer readable code, and/or program code, referred hereafter as code. The storage devices may be tangible, non-transitory, and/or non-trans-mission. The storage devices may not embody signals. In certain embodiments, the storage devices only employ sig-nals for accessing code.

Many of the functional units described in this specifica-tion have been labeled as modules, in order to more par-ticularly emphasize their implementation independence. For example, a module may be implemented as a hardware circuit comprising custom very large scale integrated ("VLSI") circuits or gate arrays, off-the-shelf semiconduc-tors such as logic chips, transistors, or other discrete com-ponents. A module may also be implemented in program-mable hardware devices such as a field programmable gate array ("FPGA"), programmable array logic, programmable logic devices or the like.

Modules may also be implemented in code and/or soft-ware for execution by various types of processors. An identified module of code may, for instance, comprise one or more physical or logical blocks of executable code which may, for instance, be organized as an object, procedure, or function. Nevertheless, the executables of an identified module need not be physically located together, but may comprise disparate instructions stored in different locations which, when joined logically together, comprise the module and achieve the stated purpose for the module.

Indeed, a module of code may be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different computer read-able storage devices. Where a module or portions of a module are implemented in software, the software portions are stored on one or more computer readable storage devices.

Any combination of one or more computer readable medium may be utilized. The computer readable medium may be a computer readable storage medium. The computer readable storage medium may be a storage device storing the code. The storage device may be, for example, but not limited to, an electronic, magnetic, optical, electromagnetic, infrared, holographic, micromechanical, or semiconductor system, apparatus, or device, or any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

More specific examples (a non-exhaustive list) of the storage device would include the following: an electrical connection having one or more wires, a portable computer diskette, a hard disk, a random access memory ("RAM"), a read-only memory ("ROM"), an erasable programmable read-only memory ("EPROM" or "Flash memory"), a portable compact disc read-only memory ("CD-ROM"), an optical storage device, a magnetic storage device, or any suitable combination of the foregoing. In the context of this document, a computer readable storage medium may be any tangible medium that can contain, or store a program for use by or in connection with an instruction execution system, apparatus, or device.

Code for carrying out operations for embodiments may be written in any combination of one or more programming languages including an object oriented programming language such as Python, Ruby, R, Java, Java Script, Smalltalk, C++, C sharp, Lisp, Clojure, PHP, or the like, and conventional procedural programming languages, such as the "C" programming language, or the like, and/or machine languages such as assembly languages. The code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network ("LAN") or a wide area network ("WAN"), or the connection may be made to an external computer (for example, through the Internet using an Internet Service Provider).

Reference throughout this specification to "one embodiment," "an embodiment," or similar language means that a particular feature, structure, or characteristic described in connection with the embodiment is included in at least one embodiment. Thus, appearances of the phrases "in one embodiment," "in an embodiment," and similar language throughout this specification may, but do not necessarily, all refer to the same embodiment, but mean "one or more but not all embodiments" unless expressly specified otherwise. The terms "including," "comprising," "having," and variations thereof mean "including but not limited to," unless expressly specified otherwise. An enumerated listing of items does not imply that any or all of the items are mutually exclusive, unless expressly specified otherwise. The terms "a," "an," and "the" also refer to "one or more" unless expressly specified otherwise.

Furthermore, the described features, structures, or characteristics of the embodiments may be combined in any suitable manner. In the following description, numerous specific details are provided, such as examples of programming, software modules, user selections, network transactions, database queries, database structures, hardware modules, hardware circuits, hardware chips, etc., to provide a thorough understanding of embodiments. One skilled in the relevant art will recognize, however, that embodiments may be practiced without one or more of the specific details, or with other methods, components, materials, and so forth. In other instances, well-known structures, materials, or operations are not shown or described in detail to avoid obscuring aspects of various embodiments.

Aspects of the embodiments are described below with reference to schematic flowchart diagrams and/or schematic block diagrams of methods, apparatuses, systems, and program products according to embodiments. It will be understood that each block of the schematic flowchart diagrams and/or schematic block diagrams, and combinations of blocks in the schematic flowchart diagrams and/or schematic block diagrams, can be implemented by code, by hardware circuits or by a programmable hardware device. Where embodied by code, the code may be provided to a processor of a general purpose computer, special purpose computer, controller, or other programmable data processing apparatus to produce a machine, such that the instructions, which execute via the processor of the computer or other programmable data processing apparatus, create means for implementing the functions/acts specified in the schematic flowchart diagrams and/or schematic block diagrams block or blocks.

The code may also be stored in a storage device that can direct a computer, other programmable data processing apparatus, or other devices to function in a particular manner, such that the instructions stored in the storage device produce an article of manufacture including instructions which implement the function/act specified in the schematic flowchart diagrams and/or schematic block diagrams block or blocks.

The code may also be loaded onto a computer, other programmable data processing apparatus, or other devices to cause a series of operational steps to be performed on the computer, other programmable apparatus or other devices to produce a computer implemented process such that the code which execute on the computer or other programmable apparatus provide processes for implementing the functions/acts specified in the flowchart and/or block diagram block or blocks.

The schematic flowchart diagrams and/or schematic block diagrams in the Figures illustrate the architecture, functionality, and operation of possible implementations of apparatuses, systems, methods and program products according to various embodiments. In this regard, each block in the schematic flowchart diagrams and/or schematic block diagrams may represent a module, segment, or portion of code, which comprises one or more executable instructions of the code for implementing the specified logical function(s).

It should also be noted that, in some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. Other steps and methods may be conceived that are equivalent in function, logic, or effect to one or more blocks, or portions thereof, of the illustrated Figures.

Although various arrow types and line types may be employed in the flowchart and/or block diagrams, they are understood not to limit the scope of the corresponding embodiments. Indeed, some arrows or other connectors may be used to indicate only the logical flow of the depicted embodiments. For instance, an arrow may indicate a waiting or monitoring period of unspecified duration between enumerated steps of the depicted embodiments. It will also be noted that each block of the block diagrams and/or flowchart diagrams, and combinations of blocks in the block diagrams and/or flowchart diagrams, can be implemented by special purpose hardware-based systems that perform the specified functions or acts, or combinations of special purpose hardware and code.

The description of elements in each figure may refer to elements of proceeding figures. Like numbers refer to like elements in all figures, including alternate embodiments of like elements.

As used herein, a list with a conjunction of "and/or" includes any single item in the list or a combination of items in the list. For example, a list of A, B and/or C includes only A, only B, only C, a combination of A and B, a combination of B and C, a combination of A and C or a combination of A, B and C. As used herein, a list using the terminology "one or more of" includes any single item in the list or a combination of items in the list. For example, one or more of A, B and C includes only A, only B, only C, a combination of A and B, a combination of B and C, a combination of A and C or a combination of A, B and C. As used herein, a list using the terminology "one of" includes one and only one of any single item in the list. For example, "one of A, B and C" includes only A, only B or only C and excludes combinations of A, B and C.

A method for tunning high speed link parameters for cables with a transceiver at each end includes transmitting, in response to establishing a link, an eye pattern bit sequence from a first computing device to a second computing device over a cable with a transceiver connected to each end of the cable. Establishing the link includes establishing a communication link over the cable between the first computing device and the second computing device. The method includes receiving an eye pattern quality message from the second computing device using a device discovery protocol. The eye pattern quality message includes quality information of a received waveform corresponding to the transmitted eye pattern bit sequence. The method includes adjusting transmission parameters for transmission over the cable in response to the quality information, and retransmitting the eye pattern bit sequence using the adjusted transmission parameters.

In some embodiments, the method includes repeating receiving an eye pattern quality message, adjusting the transmission parameters and retransmitting the eye pattern bit sequence until the eye pattern quality message indicates an eye pattern received by the second computing device that a received eye pattern is within an acceptable tolerance of an optimal eye pattern in response to transmission of the eye pattern bit sequence. In other embodiments, the method includes, in response to not receiving an eye pattern quality message before expiration of a quality message timer, changing the transmission parameters to values corresponding to receipt of a last eye pattern quality message. In other embodiments, the method includes transmitting a link up completion message in response to the eye pattern quality message indicating the received eye pattern is within an acceptable tolerance of the optimal eye pattern. In other embodiments, the method includes transmitting an optimization failure message in response to a number of times of repeating receiving an eye pattern quality message, adjusting the transmission parameters and retransmitting the eye pattern bit sequence reaches a trials limit.

In some embodiments, transmission parameters used to transmit the eye pattern bit sequence in response to establishing the link include default transmission parameters based on manufacturer supplied data corresponding to the cable. In other embodiments, the transmission parameters include a transmission driver current and pre-emphasis parameters. In other embodiments, the eye pattern quality message includes an amount of deviation from an optimal eye pattern. In other embodiments, the cable is a copper direct attach cable ("DAC") or an active optical cable ("AOC"). In other embodiments, the device discovery protocol is a link layer discovery protocol ("LLDP").

A method for determining quality information, at a computing device, of a waveform with an eye pattern includes receiving, at a second computing device, a waveform with an eye pattern transmitted from a first computing device. The first computing device is connected to the second computing device with a cable with a transceiver at each end of the cable. The received waveform is in response to the first computing device transmitting an eye pattern bit sequence in response to establishing a communication link between the first and second computing devices. The method includes determining a BER from the received waveform, comparing the received waveform with an optimal eye pattern, deriving quality information from the comparison of the received waveform with the optimal eye pattern and the determined BER, and transmitting an eye pattern quality message to the first computing device using a device discovery protocol. The eye pattern quality message includes the quality information and the first computing device adjusts transmission parameters in response to the eye pattern quality message and retransmits an eye pattern bit sequence to the second computing device.

In some embodiments, the method includes, for each waveform with an eye pattern received from the first computing device, comparing the received waveform with the optimal eye pattern, deriving quality information from the comparison of the received waveform with the optimal eye pattern, and transmitting to the first computing device an eye pattern quality message with the derived quality information. The first computing device continues to adjust the transmission parameters and retransmits the eye pattern bit sequence until a received eye pattern quality message indicates that a received eye pattern is within an acceptable tolerance of an optimal eye pattern. In other embodiments, transmission parameters used by the first computing device to transmit the eye pattern bit sequence in response to establishing the link include default transmission parameters based on manufacturer supplied data corresponding to the cable.

In some embodiments, deriving quality information from the comparison of the received waveform with the optimal eye pattern includes determining differences between a plurality of quality parameters of the waveform and the optimal eye pattern and the quality information includes a value for each of the plurality of quality parameters. In other embodiments, the cable is a copper DAC or an AOC and the device discovery protocol is a LLDP.

An apparatus for tunning high speed link parameters for cables with a transceiver at each end includes an eye pattern transmitter configured to transmit, in response to establishing a link, an eye pattern bit sequence from a first computing device to a second computing device over a cable with a transceiver connected to each end of the cable. Establishing the link includes a communication link module establishing a communication link over the cable between the first computing device and the second computing device. The apparatus includes a quality message module configured to receive an eye pattern quality message from the second computing device using a device discovery protocol. The eye pattern quality message includes quality information of a received waveform corresponding to the transmitted eye pattern bit sequence. The apparatus includes an adjustment module configured to adjust transmission parameters for transmission over the cable in response to the quality information, and the eye pattern transmitter is further configured to retransmit the eye pattern bit sequence using the adjusted transmission parameters. The quality message module continues to receive eye pattern quality messages, the adjustment module continues to adjust the transmission parameters from quality information from a most recently received eye pattern quality message, and the eye pattern transmission continues to retransmit the eye pattern bit sequence using the adjusted transmission parameters until a received eye pattern quality message indicates that a received eye pattern is within an acceptable tolerance of an optimal eye pattern.

In some embodiments, the apparatus includes a link ready module configured to transmit a link up completion message in response to the eye pattern quality message indicating that a received eye pattern is within an acceptable tolerance of the optimal eye pattern. In other embodiments, the apparatus includes a failure module configured to transmit an optimization failure message in response to the failure module determining that a number of times of repeating receiving an eye pattern quality message, adjusting the transmission parameters and retransmitting the eye pattern bit sequence reaches a trials limit. In other embodiments, the apparatus includes, at the second computing device, an eye pattern receiver configured to receive a waveform with an eye pattern transmitted from the first computing device, a BER module configured to determine a BER from the received waveform, a comparison module configured to compare the received waveform with an optimal eye pattern, an analysis module configured to derive quality information from the comparison of the received waveform with the optimal eye pattern and the BER, and a quality message transmitter configured to transmit an eye pattern quality message to the first computing device using the device discovery protocol. The eye pattern quality message includes the derived quality information.

In some embodiments, transmission parameters used to transmit the eye pattern bit sequence in response to establishing the link include default transmission parameters based on manufacturer supplied data corresponding to the cable. In other embodiments, the transmission parameters include a transmission driver current and pre-emphasis parameters. In other embodiments, the eye pattern message includes an amount of deviation from an optimal eye pattern. In other embodiments, the cable comprises is a copper DAC or an AOC and the device discovery protocol is a LLDP.

FIG. 1 is a schematic block diagram 100 illustrating computer equipment racks 102 with cables 110 each with a transceiver at each 112 end, according to various embodiments. While two computer equipment racks 102 are shown, one of skill in the art will recognize that any number of racks may have computing devices connected with cables 110 that have a transceiver 112 at each end. The computer equipment racks 102 are depicted with servers 106, switches 104, and storage devices 108, which is merely representative of types of computing equipment that could be in a computer equipment rack 102. Other computing devices (not shown) that may be connected by a cable 110 with a transceiver 112 at both ends include routers, power supplies, storage controllers, and the like. One of skill in the art will recognize other types of equipment connected by a cable 110 with a transceiver 112 at both ends that may or may not be located in a computer equipment rack 102.

In some embodiments, the computing devices (e.g. 104, 106, 108) connected by a cable 110 with a transceiver 112 at both ends are located in a datacenter. In other embodiments, the computing devices connected by a cable 110 with a transceiver 112 at both ends is located at an edge computing location, such as at a retail store, at a central facility connecting retail stores or other stores, etc. One of skill in the art will recognize other environments or locations with computing devices connected by a cable 110 with a transceiver 112 at both ends.

Once a cable 110 with a transceiver 112 at both ends is connected between computing devices, a communication link between the computing devices may be able to communicate but transmission of data between the computing devices may not be optimized for high-speed communications. While 1 giga-bit-per-second ("Gbps") Base T is often used, higher transmission rates are becoming common, such as 10 Gbps, 25 Gbps, 100 Gbps and even 200 Gbps. Transmission speeds may also be increased using parallel cables 110. Each transmission speed typically has a different standard for transceivers 112 and cables 110 running at the transmission speed. In addition, each transmission speed may also have a different transmission standard for different cable lengths and for the cable media, which can be copper or optical fiber.

While manufacturers often test computing devices for different cable types, different cable lengths, and different transmission speeds to determine optimal transmission parameters, not all combinations are available and the large number of available combinations results in various combinations not having optimized transmission parameters for some installations. A method called auto-negotiation has been used to dynamically alter transmission parameters. However, auto-negotiation is not applicable to 10 Gbps and higher transmission rates and relies on low-level communication methods.

Embodiments described herein provide a transmission parameter optimization solution that is applicable to any transmission speed, any cable length and between any two computing devices. Embodiments of the solution are described below in relation to the apparatuses 300, 301, 400, 401 of FIGS. 3 and 4.

Figure 2:
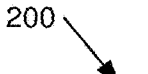
FIG. 2 is a schematic block diagram illustrating servers and a switch connected with cables with a transceiver at each end, according to various embodiments.
Figure 2:
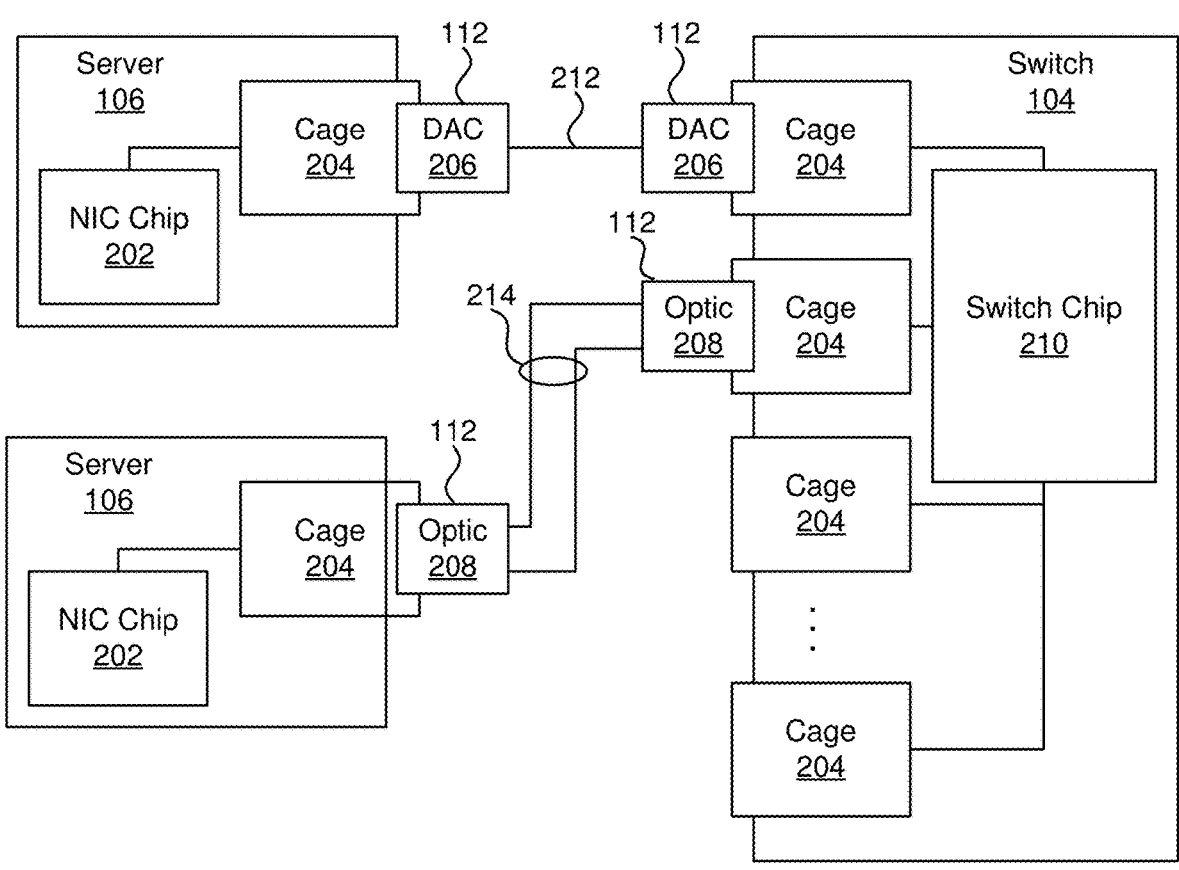

FIG. 2 is a schematic block diagram 200 illustrating servers 106 and a switch 104 connected with cables 110 with a transceiver 112 at each end, according to various embodiments. Each server 106 includes a network interface card ("NIC") chip 202 and the switch 104 includes a switch chip 210 where communication over cables 110 between the servers 106 and switch 104 go through the NIC chip 202 and switch chip 210.

The cables 110 included herein differ from other typical networking cables for typical computing devices, such as laptop computers, desktop computers, tablet computers, etc., which are typically suitable for lower speed network communications. The cables 110 for the embodiments described herein are for higher transmission speeds, such as above 10 Gbps. The high speed cables 110 each include a transceiver 112 at each end, which require a special connector or "cage" 204 in the computing devices (e.g. 104, 106). The cages differ based on the transmission speed, manufacturer, etc. Each cage 204 is designed to connect to a particular transceiver 112. Often a transceiver 112 will include a printed circuit board ("PCB") with traces at an edge that plug into a receiver, similar to how a memory card plugs into a motherboard. Each transceiver 112 converts signals from the cables to a format suitable for the connected computing devices.

Cables 110 currently come in two types: copper and optical. The copper cable are typically referred to as direct attach copper ("DAC") or direct attach ("DA") each includes specific transceivers 112 (e.g. DAC 206) at each end that are securely connected to the copper cable 212. Optical cables, which in some embodiments, are called active optical cables ("AOC") also include a specific transceiver 112 (e.g. optical transceiver 208) at each end. For AOC and other optical cables 214 that connect to an optical transceiver 208, the optical cables 214 connect with a connector that allows the optical cables 214 to be plugged into the optical transceiver 208 and are detachable. Typically, for each data lane there are two optical cables 214, which may or may not be bundled together, while a single copper cable includes a pair of copper wires bundled in a cable. Some cables 110 include multiple pairs of conductors or optical fiber strands.

Typical standards for various transmission speeds for cables 110 with a transceiver 112 at each end are SFP (small form-factor pluggable), SFP+, SPF28, QSPF+ (quad small form-factor pluggable+), and QSFP28. The standards are applicable to copper cables 212 and optical cables 214, but typically copper cables 212 compliant with a standard are shorter than optical cables 214 compliant with the same standard. SFP allows up to 1 Gbps and SFP+ supports up to 10 Gbps. QSFP+ supports transmission speeds of up to 10 Gbps but includes four channels, which effectively quadruples the transmission rate to 40 Gbps. SFP28 supports up to 25 Gbps and QSFP28 allows transmission speeds up to 25 Gbps but also includes four channels, which allows up to 100 Gbps. The standards mentioned above are some of the available standards and the embodiments described herein are applicable to any cable 110 with a transceiver 112 at each end of the cable 110 regardless of transmission speed or applicable standard or sub-standard.

In addition, each standard has variations based on length and cable type. CR is a copper cable standard. SR is a short range standard up to 1000 meters ("m") for optical cable 214. LR is a long range standard up to 20 kilometers ("km"), ER is an extended range standard up to 40 km, and ZR is "Ze best" range up to 80 km. Adding a "4" indicates a cable with four channels. Thus, with all of the various standards and length variations along with different cable manufacturers and different computing device manufacturers that contribute to a very large list of possible combinations, lab testing to find optimal parameters is extremely difficult.

Figure 3:
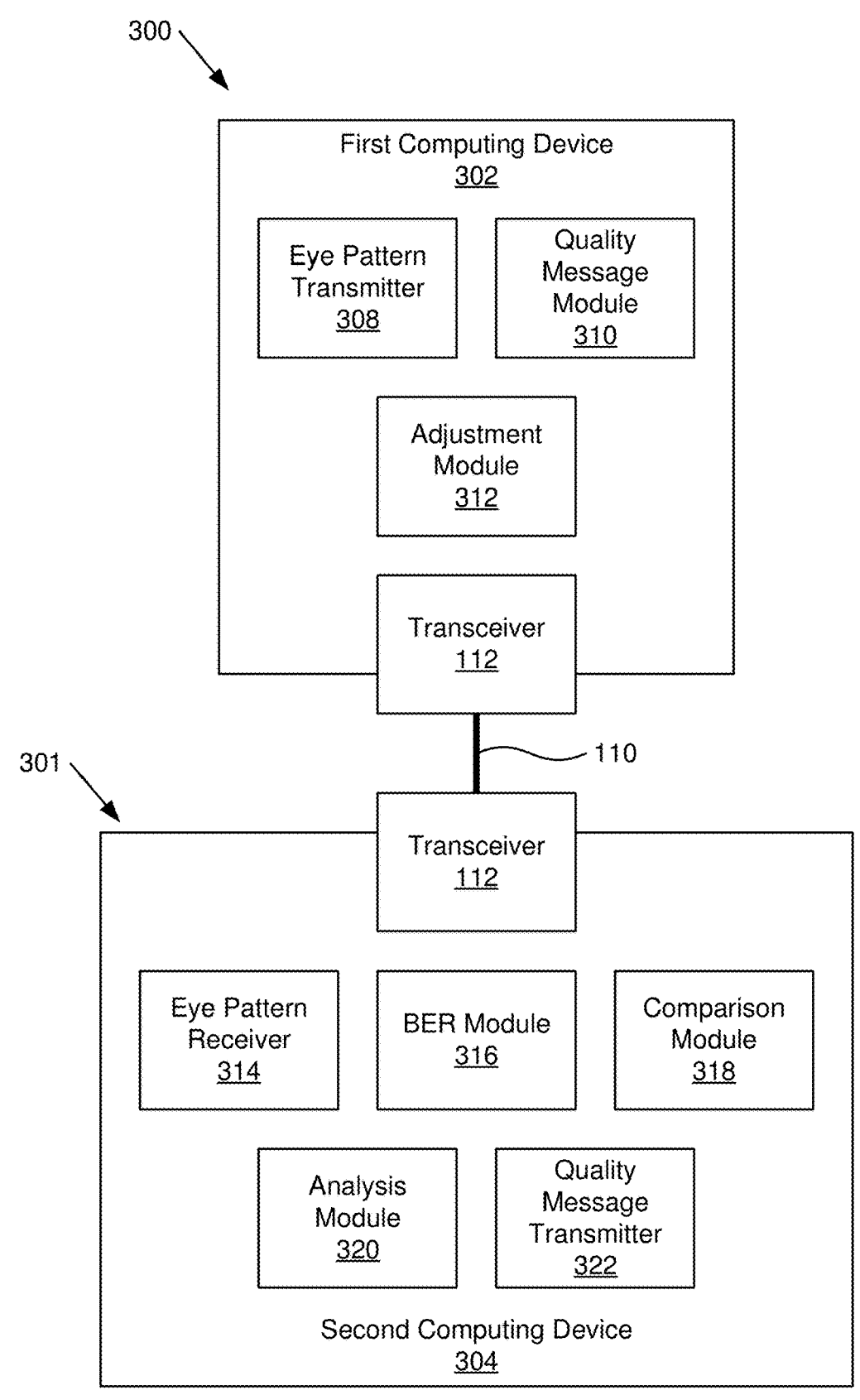
FIG. 3 is a schematic block diagram illustrating a first apparatus in a first computing device and a second apparatus in a second computing device where the first and second computing devices are connected with a cable with a trans-ceiver at each end, according to various embodiments.

FIG. 3 is a schematic block diagram illustrating a first apparatus 300 in a first computing device 302 and a second apparatus 301 in an embodiment of a second computing device 304 where the first and second computing devices 302, 304 are connected with a cable 110 with a transceiver 112 at each end, according to various embodiments. The first apparatus 300 at the first computing device 302 includes an eye pattern transmitter 308, a quality message module 310, an adjustment module 312 and an eye pattern receiver 314 and the second apparatus 301 in the second computing device 304 includes an eye pattern receiver 314, a BER module 316, a comparison module 318, an analysis module 320 and a quality message transmitter 322, which are described below. In some embodiments, the apparatuses 300, 301 are implemented with code stored on computer readable media. In other embodiments, some or all of the apparatuses 300, 301 are implemented using hardware circuits and/or a programmable hardware device.

The first and second computing devices 302, 304 may be a switch 104, a server 106, a data storage device 108, a router, a power supply, or any other devices connected by a cable 110 with transceivers 112 at either end of the cable 110. In some embodiments, calibration is performed for a particular first computing device 302 transmitting to a second computing device 304 and then the roles are reversed. For example, a server 106 may be the first computing device 302 and a switch 104 may be the second computing device 304 and after calibration the switch 104 becomes the first computing device 302 and the server 106 becomes the second computing device 304.

The first apparatus 300 includes an eye pattern transmitter 308 configured to transmit, in response to establishing a link, an eye pattern bit sequence from the first computing device 302 to the second computing device 304 over a cable 110 with a transceiver 112 connected to each end of the cable 110. Establishing the link includes establishing a communication link over the cable 110 between the first computing device 302 and the second computing device 304.

Typically, the first computing device 302 will include or can obtain default transmission parameters applicable to the particular cable 110 and cable length that are sufficient to establish a communication link between the first computing device 302 and the second computing device 304 over the cable 110. In some embodiments, the first computing device 302 includes a table or other data structure with default transmission parameters and selects transmission parameters based on the particular cable 110 and cable length. In some embodiments, the transmission parameters are uploaded prior to or in conjunction with installation of the cable 110, such as via a manufacturer's website, a compact disk ("CD"), flash drive, etc. supplied with the cable 110, or the like. While the default transmission parameters are typically capable of establishing a communication link, the communication link is typically not optimized.

In other embodiments, default parameters are insufficient to establish the communication link over the cable 110 and establishing the communication link includes intervention to vary transmission parameters to establish the communication link. In some embodiments, the intervention is done by a communication link module 402, which is described below. In other embodiments, a system administrator varies the transmission parameters to establish the communication link.

Figure 8:
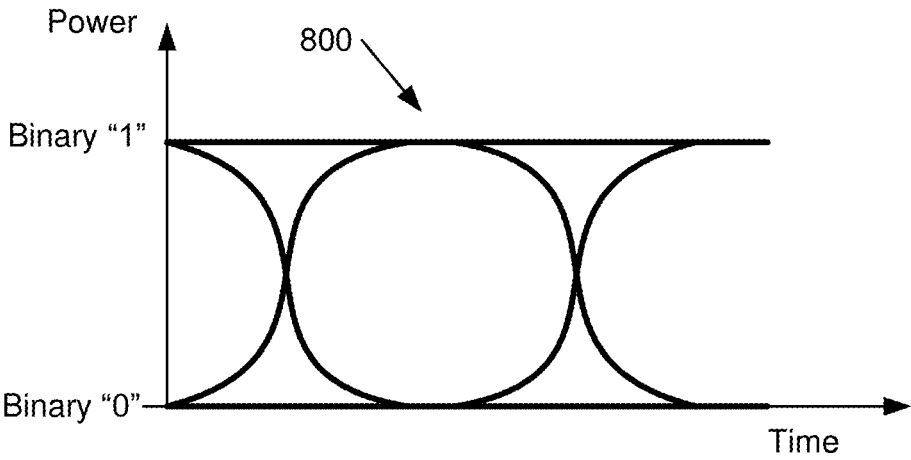
FIG. 8 is a diagram illustrating an eye pattern.

Once the communication link is established, the eye pattern transmitter 308 uses the default transmission parameters to transmit an eye pattern bit sequence from the first computing device 302 to the second computing device 304 over the cable 110. The eye pattern bit sequence is a bit sequence that produces an eye pattern 800, similar to the eye pattern 800 as depicted in FIG. 8. Constant binary 1 and 0 levels are shown along with transitions from 0 to 1, 1 to 0, 0 to 1 to 0 and 1 to 0 to 1. One of skill in the art will recognize a formulation of the eye pattern bit sequence capable of producing the eye pattern 800 at the second computing device 304.

The eye pattern 800 may be displayed as an oscilloscope display, which is a digital signal from a receiver (the second computing device 304) that is repetitively sampled and applied to the vertical input while the data transmission rate is used to trigger the horizontal sweep. In embodiments described herein, the second computing device 304 is capable of detecting and analyzing the eye pattern 800 to determine how close the received eye pattern 800 is to an optimal eye pattern. Several system performance measures can typically be derived by analyzing the received eye pattern 800. If the signals are too long, too short, poorly synchronized with the system clock, too high, too low, too noisy, too slow to change, have too much undershoot or overshoot, etc., these issues can be observed from the eye pattern 800. An open, properly shaped eye pattern corresponds to minimal signal distortion. Distortion of the signal waveform due to intersymbol interference ("ISI") and noise often appears as closure of the eye pattern 800.

The first apparatus 300 of FIG. 3 includes a quality message module 310 configured to receive an eye pattern quality message from the second computing device 304 using a device discovery protocol. After receiving and analyzing the eye pattern 800, the second computing device 304 transmits the eye pattern quality message to the first computing device 302. The eye pattern quality message includes quality information of a received waveform corresponding to the transmitted eye pattern bit sequence.

The quality information, in some embodiments, includes a bit error rate ("BER") of the waveform with the eye pattern 800 received by the second computing device 304. The BER is the number of bit errors per unit of time. In some embodiments, the quality information includes a bit error ratio (also "BER") which is the number of bit errors divided by the total number of transferred bits during a particular time period. In some instances, due to distortions, transitions from 0 to 1 or 1 to 0 that take too long, or other problems, some bits may not be detected by the second computing device 304. Typically, the BER is determined based on an expected bit pattern. Where the eye pattern bit sequence is known, the received waveform at the second computing device 304 knows the eye pattern bit sequence and can compare the received waveform against the eye pattern bit sequence to the determine the BER. The BER is useful in determining changes to the transmission parameters.

The quality information in the eye pattern quality message also includes quality information about the received eye pattern 800 as compared to an optimal eye pattern. In various examples, the quality information includes parameters such as overshoot, rising slope, decreasing slope, eye pattern area, eye pattern width, or other parameters as compared to an optimal eye pattern. For example, the eye pattern area from the received waveform at the second computing device 304 may have an area of 68 while an area of an optimal eye pattern may have an area of 100 so the quality information include some indication of how the area of the received waveform compares to the optimal eye pattern.

In some embodiments, the quality information includes a difference between the optimal value (e.g. 100) and the received area value of 68, which results in a 32 in the area field of the eye pattern quality message. In other embodiments, the quality message module 310 knows the optimal eye pattern area of 100 so the quality information includes a value of 68. Similar measures with respect to an eye pattern 800 for other parameters describing the received waveform are included in the quality information either in a compared form or a raw form. One of skill in the art will recognize other ways to formulate quality information to convey information about a received eye pattern 800.

The quality message module 310 transmits the eye pattern quality message from the second computing device using a device discovery protocol. The device discovery protocol, in some embodiments, is a protocol used to convey information about a device to other devices in a network. For example, the device discovery protocol may transmit identity information, capabilities, neighboring device information, etc. over a local area network ("LAN") (not shown). In some embodiments, the device discovery protocol uses Ethernet.

The device discovery protocol may transmit information such as an internet protocol ("IP") address, a media access control ("MAC") address, a port name and number, a system name and description, switching and routing capabilities, link aggregation information, and the like. In some embodiments, the device discovery protocol is a link layer discovery protocol ("LLDP"), which is a vendor-neutral link layer protocol. In other embodiments, the device discovery protocol is control point discovery ("CDP"), link layer discovery protocol-media endpoint discovery, ("LLDP-MED"), link discovery Windows ("LDWin") or other device discovery protocol capable of transmitting an eye pattern quality message. Using a device discovery protocol is beneficial because the first computing device 302 and the second computing device 304 are likely to support a device discovery protocol and the eye pattern quality message can be implemented using known methods associated with the device discovery protocol.

The first apparatus 300 of FIG. 3 includes an adjustment module 312 configured to adjust transmission parameters for transmission over the cable in response to the quality information. The transmission parameters include transmit side driver signal strength and pre-emphasis parameters. As frequency increases losses due to dielectric loss and skin effect attenuate transmitted signals. A simple solution is to increase the transmit side driver signal strength, which has some effect in overcoming signal loss due to attenuation. The adjustment module 312, in some embodiments, includes adjustment of the driver signal strength.

In other embodiments, the adjustment module 312 includes adjustment of pre-emphasis parameters. A transmitted square wave that includes sharp transitions can be broken down using a Fourier analysis into various frequency components. Higher frequency components are attenuated more due to the dielectric loss and skin effect so that a received waveform transitions from low to high and high to low at a lower rate. One common way to overcome the dielectric loss and skin effect is to overshoot voltage during a first part of a transition, which helps to increase high frequency amplitude of the transmitted waveform. Since digital waveforms are only transitions between two voltage levels, pre-emphasis parameters are effective to tune a received eye pattern.

Figure 9:
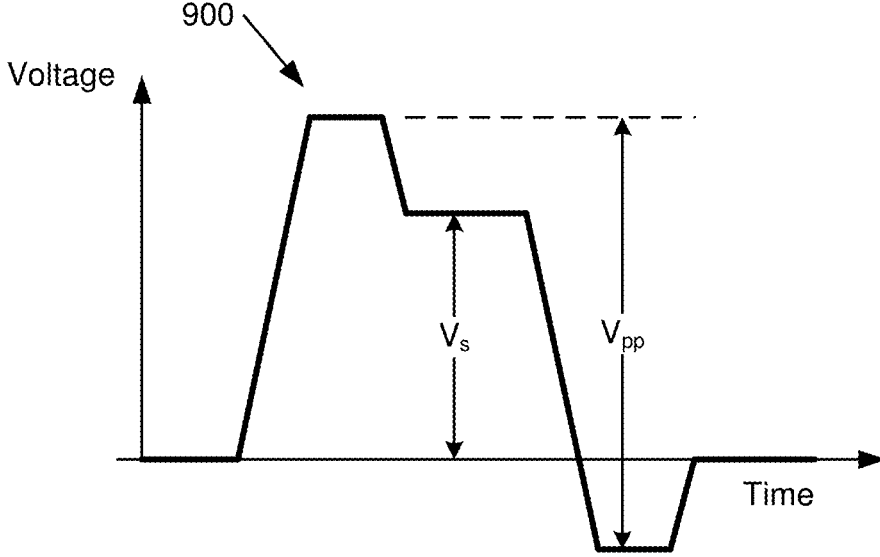
FIG. 9 is a diagram illustrating a pre-emphasis waveform.

FIG. 9 is a diagram illustrating a pre-emphasis waveform 900 depicting a static voltage level Vs and a peak-to-peak voltage level $V_{pp}$ where the adjustment module 312 includes adjustment of pre-emphasis parameters to produce a transmitted waveform that includes voltage overshoot as depicted in FIG. 9. In some embodiments, a signal driver circuit in the first computing device 302 includes fixed pre-emphasis levels, such as 11%, 36%, 65%, 100% and 140% and the adjustment module 312 selects one of the pre-defined overshoot levels based on the quality information to overcome deficiencies of the waveform of the eye pattern 800 received by the second computing device 304. In other embodiments, the adjustment module 312 produces a custom overshoot level.

In some embodiments, the adjustment module 312 selects an overshoot time that determines how long the driver signal is at the selected overshoot voltage level. In other embodiments, the adjustment module 312 selects static voltage level Vs. In other embodiments, the adjustment module 312 selects a minimum length of time that a signal stays at a level (0 or 1) before transitioning. One of skill in the art will recognize other parameters that may be adjusted by the adjustment module 312.

In some embodiments, the adjustment module 312 has set values that are selected based on certain parameters of the quality information. For example, certain values of parameters of the quality information may correspond to voltage overshoot values, time limits, driver signal strength, etc. Other values of the quality information include, for example, BER, which the adjustment module 312 may also use to adjust the transmission parameters. In other embodiments, the adjustment module 312 includes one or more equations that have parameters of the quality information as input and outputs are one or more transmission parameters.

In some embodiments, the adjustment module 312 adjusts the transmission parameters based on an analysis of the quality information of the eye pattern quality message. In some embodiments, the adjustment module 312 analyzes quality information that is based on a comparison of the waveform received by the second computing device 304 to an optimal eye pattern. In other embodiments, the second computing device 304 transmits parameters derived from the received waveform in the eye pattern quality message and the adjustment module 312 includes an analysis module that compares the parameters from the received waveform with the optimal eye pattern. Thus, comparing of the parameters derived from the received waveform with an optimal eye pattern may be done in the second computing device 304 or the first computing device 302.

In other embodiments, the adjustment module 312 includes one or more recursion routines that are used to refine transmission parameters to get closer to an optimal eye pattern at the second computing device 304. In other embodiments, the adjustment module 312 includes one or more hysteresis loops to prevent hunting between parameter values. In other embodiments, the adjustment module 312 includes one or more iteration limits that stop variation of transmission parameters after a certain number of iterations or after a certain number of iterations between two values. One of skill in the art will recognize other ways for the adjustment module 312 to adjust transmission parameters of the first computing device 302 based on parameters of the quality information from a received eye pattern quality message.

The eye pattern transmitter 308 is then configured to retransmit the eye pattern bit sequence using the adjusted transmission parameters. For example, the eye pattern transmitter 308 may use transmission parameters with a higher signal strength, an adjusted overshoot, etc., or other updated transmission parameter from the adjustment module 312.

The second apparatus 301 of FIG. 3 includes a second computing device 304 that is connected to the first computing device 302 over a cable 110 with transceivers 112 at each end, according to various embodiments. The second apparatus 304, in some embodiments, includes an eye pattern receiver 314 configured to receive, at a second computing device 304, a waveform that includes an eye pattern 800 transmitted from the first computing device 302. The first computing device 302 is connected to the second computing device 304 with a cable 110 with a transceiver 112 at each end of the cable 110. The received waveform is in response to the first computing device 302 transmitting an eye pattern bit sequence in response to establishing a communication link between the first and second computing devices 302, 304. In some embodiments, the first apparatus 300 and the second apparatus 301 communicate to initiate calibration mode so that the eye pattern receiver 314 is expecting to receive a waveform with the eye pattern 800. In other embodiments, the eye pattern receiver 314 knows that an eye pattern 800 is coming just after establishing the communication link between the first computing device 302 and the second computing device 304. In other embodiments, the eye pattern receiver 314 detects the eye pattern 800 in a received waveform.

The second apparatus 301 includes, in some embodiments, a BER module 316 configured to determine a bit error rate ("BER") from the received waveform. In one example, the BER module 316 includes hardware circuits configured to detect voltage transitions, length of time at a voltage corresponding to a zero or a one, or other hardware that distinguishes between noise and legitimate transitions from 1 to 0 and 0 to 1. In other embodiments, the BER module 316 accesses information from hardware circuits to determine the BER of a received eye pattern 800.

The second apparatus 301 includes, in some embodiments, a comparison module 318 configured to compare the received waveform with an optimal eye pattern. In some embodiments, the comparison module 318 accesses an optimal eye pattern stored in a library, a database, etc. with eye patterns and selects an optimal eye pattern most applicable to what is expected at the second computing device 304. In other embodiments, the optimal eye pattern is a standard eye pattern and the comparison module 318 uses the standard eye pattern for comparison. In other embodiments, the optimal eye pattern is loaded into a particular location or is coded into the comparison module 318.

In some embodiments, the optimal eye pattern includes various values, fields, parameters, etc. that correspond with an optimal eye pattern. For example, an optimal eye pattern may have a particular minimum voltage, a particular maximum voltage, a particular area, an ideal slope for transitions from 1 to 0 and 0 to 1, and the like and the comparison module 318 extracts similar values from the waveform received by the eye pattern receiver 314.

In some embodiments, the comparison module 318 merely extracts eye pattern parameters from the received waveform for transmission to the first computing device 302 that analyzes the extracted eye pattern parameters and the BER to determine adjustments to the transmission parameters. For example, the adjustment module 312 may include an analysis module that compares parameters from the received waveform with parameters of an optimal eye pattern. One of skill in the art will recognize other ways for the comparison module 318 to retrieve an optimal eye pattern and compare the received waveform with the optimal eye pattern.

The second apparatus 301 includes, in some embodiments, an analysis module 320 configured to derive quality information from the comparison of the received waveform with the optimal eye pattern and the determined BER. In some embodiments, the analysis module 320 records differences between the eye pattern 800 of the received waveform for transmission to the first computing device 302. In other embodiments, the analysis module 320 performs other functions to analyze and prepare data to be included as quality information to be sent to the first computing device 302.

The second apparatus 301 includes, in some embodiments, a quality message transmitter 322 configured to transmit an eye pattern quality message to the first computing device 302 using a device discovery protocol. The device discovery protocol is the same as discussed above with regard to the quality message module 310. The eye pattern quality message includes the quality information from the analysis module 320. The first computing device 302 adjusts transmission parameters in response to the eye pattern quality message and retransmits an eye pattern bit sequence to the second computing device 304.

FIG. 4 is a schematic block diagram illustrating another first apparatus 400 in a first computing device 302 and another second apparatus 401 in a second computing device 304 where the first and second computing devices 302, 304 are connected with a cable 110 with a transceiver 112 at each end, according to various embodiments. The first apparatus 400 at the first computing device 302 includes an eye pattern transmitter 308, a quality message module 310, an adjustment module 312 and an eye pattern receiver 314, which are substantially similar to those described above in relation to the first apparatus 300 of FIG. 3. In various embodiments, the first apparatus 400 also includes a communication link module 402, a link ready module 404, a failure module 406, and a timer module 408, which are described below. The second apparatus 401 of FIG. 4 in the second computing device 304 includes an eye pattern receiver 314, a BER module 316, a comparison module 318, an analysis module 320 and a quality message transmitter 322, which are substantially similar to those of the second apparatus 301 of FIG. 3. The second apparatus 401 also includes an optimal eye module 410, which is described below. In some embodiments, the apparatuses 400, 401 are implemented with code stored on computer readable media. In other embodiments, some or all of the apparatuses 400, 401 are implemented using hardware circuits and/or a programmable hardware device.

The first apparatus 400 includes, in some embodiments, a communication link module 402 configured to establish a communication link between the first computing device 302 and the second computing device 304. In some embodiments, the communication link module 402 establishes the communication link in response to connection of the transceivers 112 of the cable 110. In other embodiments, the communication link module 402 uses default parameters for the cable 110. In some embodiments, the communication link module 402 retrieves the default parameters from the transceiver 112 of the cable 110 installed at the first computing device 302. In some examples, the communication link module 402 accesses a database, a manufacturer's website or other location to retrieve the default parameters for the cable 110. In other embodiments, the communication link module 402 uses default parameter for the cable 110 that have been previously installed. One of skill in the art will recognize other ways for the communication link module 402 to obtain default parameter to establish the communication link.

In some embodiments, the communication link module 402 establishes the communication link upon installation of the cable 110. In other embodiments, the communication link module 402 establishes the communication link in response to a power on condition of the first computing device 302. In other embodiments, the communication link module 402 establishes the communication link after receiving a command. In some embodiments, the eye pattern transmitter 308 transmits the eye pattern bit sequence in response to the communication link module 402 establishing the communication link. One of skill in the art will recognize other ways for the communication link module 402 to establish the communication link between the first and second computing devices 302, 304.

In some embodiments, the communication link module 402 is unable to establish the communications link with default transmission parameters. In some embodiments, the communication link module 402 varies transmission parameters to find parameters that will work to establish the communication link. In other embodiments, the communication link module 402 receives input from a system administrator or other person to establish the communication link when the default parameters are insufficient. One of skill in the art will recognize other ways for the communication link module 402 to establish a communication link with default transmission parameters or altered default transmission parameters.

The first apparatus 400, in some embodiments, includes a link ready module 404 configured to transmit a link up completion message in response to the eye pattern quality message indicating an optimal eye pattern in the quality information. For example, the optimal eye pattern may include ranges of parameters of the optimal eye pattern and the quality information may include whether or not each parameter is outside an applicable range. Once the adjustment module 312 and/or analysis module 320 determines that parameters of the received waveform are within acceptable ranges, the link ready module 404 transmits the link up completion message and the first computing device 302 then starts using the communication link over the cable 110 for data transmission.

In other embodiments, the adjustment module 312 and/or analysis module 320 determines one or more parameters of the quality information have reached a value such that further iteration does not cause further improvement. For example, an optimal eye pattern might include an optimal value and iterations of the transmission parameters may reach a particular peak value that is close to or at the optimal value. Once the adjustment module 312 and/or analysis module 320 determines no further improvement, the link ready module 404 transmits the link up completion message and the first computing device 302 then starts using the communication link over the cable 110 for data transmission. One of skill in the art will recognize other ways for the adjustment module 312 and/or the analysis module 320 to determine when to trigger the link ready module 404 to transmit the link up completion message.

The first apparatus 400 of FIG. 4, in some embodiments, includes a failure module 406 configured to transmit an optimization failure message in response to a number of times of repeating receiving an eye pattern quality message, adjusting the transmission parameters and retransmitting the eye pattern bit sequence reaches a trials limit. In some embodiments, the adjustment module 312 and/or analysis module 320 determines that quality information about the received waveform at the second computing device 304 is unsatisfactory after each iteration of the transmission parameters and once the number of iterations reaches the trials limit, the failure module 406 transmits the optimization failure message.

In response to an optimization failure message, the first computing device 302, a system management computer, or the like may take action to suspend communication over the cable 110 until action is taken. The action may be troubleshooting the cable 110 and/or transceivers 112, replacement of the cable 110, exchange of a transceiver 112, or other action. One of skill in the art will recognize other actions to take in response to the optimization failure message.

In some embodiments, the first apparatus 400 of FIG. 4 includes a timer module 408 configured to, in response to not receiving an eye pattern quality message before expiration of a quality message timer, changing the transmission parameters to values corresponding to receipt of a last eye pattern quality message. For example, the adjustment module 312 may change the transmission parameters such that a received waveform at the second computing device 304 may not recognize a transmitted eye pattern bit sequence. After expiration of the quality message timer, the timer module 408 changes the transmission parameters back to known good values. The known good values, in some embodiments, are transmission parameters that resulted in the quality message module 310 receiving an eye pattern quality message. Other known good transmission values may also be used by the timer module 408.

The second apparatus 401 of FIG. 4 includes an optimal eye module 410 configured to obtain an optimal eye pattern applicable to the received waveform. In some embodiments, the optimal eye module 410 accesses an optimal eye pattern stored in a library, a manufacturer's database, etc. with eye patterns and selects an optimal eye pattern most applicable to what is expected at the second computing device 304. In other embodiments, the optimal eye module 410 receives an optimal eye pattern that is loaded into a particular location or is coded into the optimal eye module 410. In other embodiments, the optimal eye module 410 retrieves the optimal eye pattern from a standards database. One of skill in the art will recognize other ways for the optimal eye module 410 to access an applicable optimal eye pattern.

Figure 5:
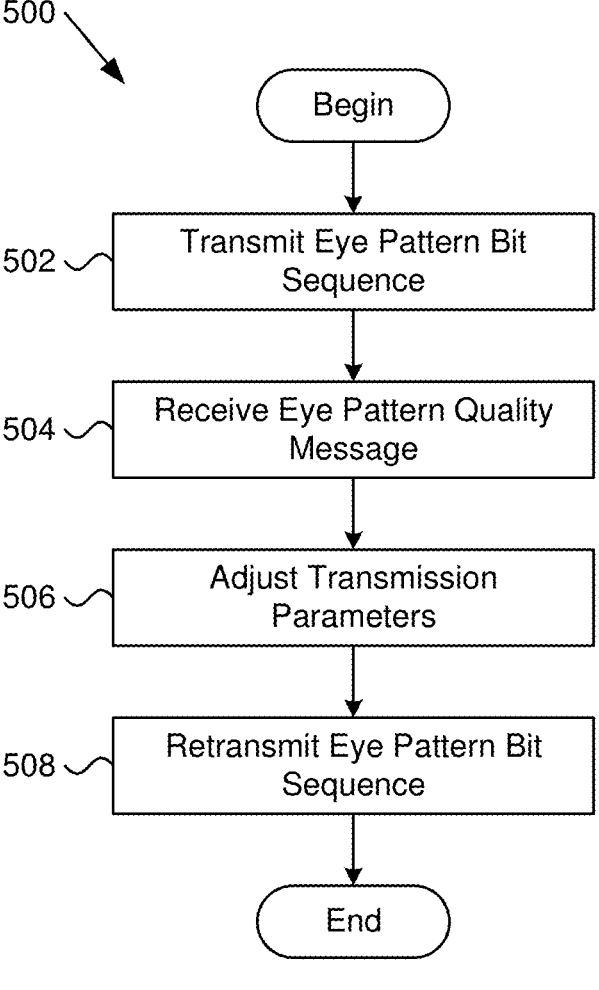
FIG. 5 is a schematic flow chart diagram illustrating a method for adjusting transmission parameters of a cable connecting two computing devices with a cable with a transceiver at each end, according to various embodiments.

FIG. 5 is a schematic flow chart diagram illustrating a method 500 for adjusting transmission parameters of a cable 110 connecting two computing devices 302, 304 with a cable 110 with a transceiver 112 at each end, according to various embodiments. The method 500 begins and transmits 502, in response to establishing a link, an eye pattern bit sequence from a first computing device 302 to a second computing device 304 over a cable 110 with a transceiver 112 connected to each end of the cable 110. Establishing the link includes establishing a communication link over the cable 110 between the first computing device 302 and the second computing device 304.

The method 500 receives 504 an eye pattern quality message from the second computing device 304 using a device discovery protocol. The eye pattern quality message includes quality information of a received waveform corresponding to the transmitted eye pattern bit sequence. For example, the device discovery protocol may be LLDP or a similar device discovery protocol. The method 500 adjusts 506 transmission parameters for transmission over the cable 110 in response to the quality information and retransmits 508 the eye pattern bit sequence using the adjusted transmission parameters, and the method 500 ends. In various embodiments, all or a portion of the method 500 is implemented with the eye pattern transmitter 308, the quality message module 310, and/or the adjustment module 312.

Figure 6:
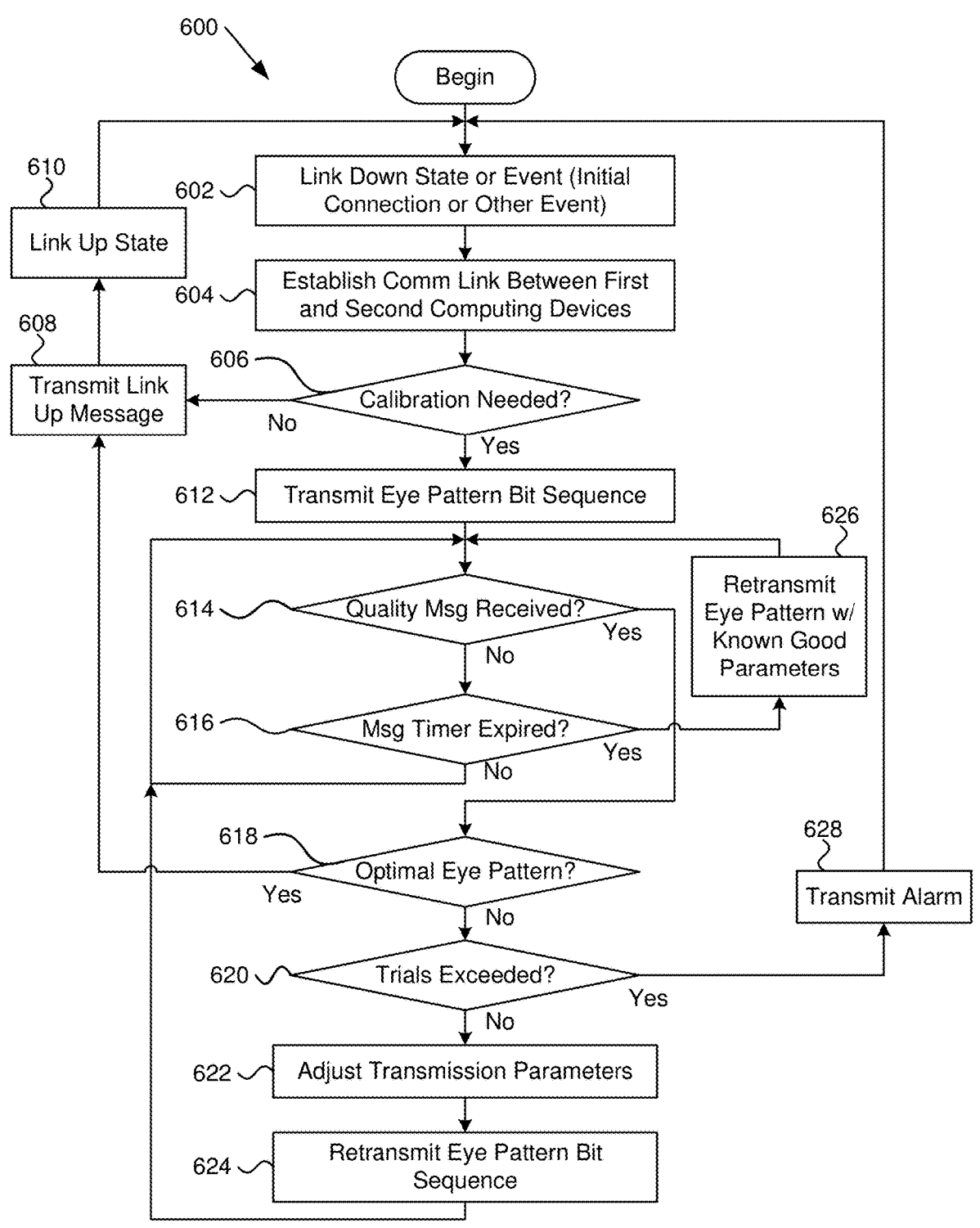
FIG. 6 is a schematic flow chart diagram illustrating another method for adjusting transmission parameters of a cable connecting two computing devices with a cable with a transceiver at each end, according to various embodiments.

FIG. 6 is a schematic flow chart diagram illustrating another method 600 for adjusting transmission parameters of a cable 110 connecting two computing devices 302, 304 with a cable with a transceiver 112 at each end, according to various embodiments. The method 600 begins in a like down state or event 602, which may include at the initial connection of the cable 110 to the first and second computing devices 302, 304. The method 600 establishes 604 a communication link between the first and second computing devices 302, 304.

The method 600 determines 606 if calibration is needed. For example, initial connection of the cable 110 typically requires calibration while a restart of the first or second computing device 302, 304 where the communication link is established may not need recalibration. If the method 600 determines 606 that calibration is not needed, the method 600 transmits 608 a link up completion message and transitions 610 to a link up state until a link down state or event 602. If the method 600 determines 606 that calibration is needed, the method 600 transmits 612 an eye pattern bit sequence from the first computing device 302 to the second computing device 304 over the cable 110 and waits for an eye pattern quality message. The method 600 initially uses default transmission parameters.

The method 600 determines 614 if an eye pattern quality message has been received at the first computing device 302. If the method 600 determines 614 that an eye pattern quality message has not been received at the first computing device 302, the method 600 determines 616 if a quality message timer has expired. If the method 600 determines 614 that the quality message timer has not expired, the method 600 returns and determines 614 if an eye pattern quality message has been received at the first computing device 302. If the method 600 determines 614 that an eye pattern quality message has been received, the method 600 determines 618 if the quality information in the eye pattern quality message indicates that a waveform received by the second computing device 304 is optimal. Determining 618 if the waveform is optimal, in some embodiments, includes determining 618 that the received waveform complies with certain standards, that a parameters of the received waveform are within specified ranges, and the like.

If the method 600 determines 618 that the quality information indicates that the received waveform is optimal, the method 600 transmits 608 a link up completion message and transitions 610 to a link up state where data is transmitted from the first computing device 302 to the second computing device 304 over the cable 110. If the method 600 determines 618 that the quality information does not indicate that the received waveform is optimal, the method 600 determines 620 if a trials limit has been exceeded. If the method 600 determines 620 that the trials limit has not been exceeded, the method 600 adjusts 622 transmission patterns for transmission over the cable 110 and retransmits 624 the eye pattern bit sequence to the second computing device 302 and returns and determines 614 if an eye pattern quality message has been received.

If the method 600 determines 616 that the quality message timer has expired, the method 600 retransmits 626 the eye pattern bit sequence using known good transmission parameters and returns and determines 614 if an eye pattern quality message was received. In some embodiments, the known good transmission pattern correspond to receipt of a last eye pattern quality message. In some embodiments, expiration of the quality message timer indicates that the second computing device 304 did not receive the eye pattern 800 or that the eye pattern 800 was distorted enough to not register as an eye pattern 800. If the method 600 determines 620 that the trials limit has been exceeded, the method 600 transmits 628 and alarm and returns to the link down state 602. The alarm indicates that the communication link between the first computing device 302 and the second computing device 304 is down. The trials limit is a certain number of iterations of adjusting 622 the transmission parameters and retransmitting 624 the eye pattern bit sequence. In various embodiments, all or a portion of the method 600 is implemented with the eye pattern transmitter 308, the quality message module 310, the adjustment module 312, the communication link module 402, the link ready module 404 and/or the failure module 406.

Figure 7:
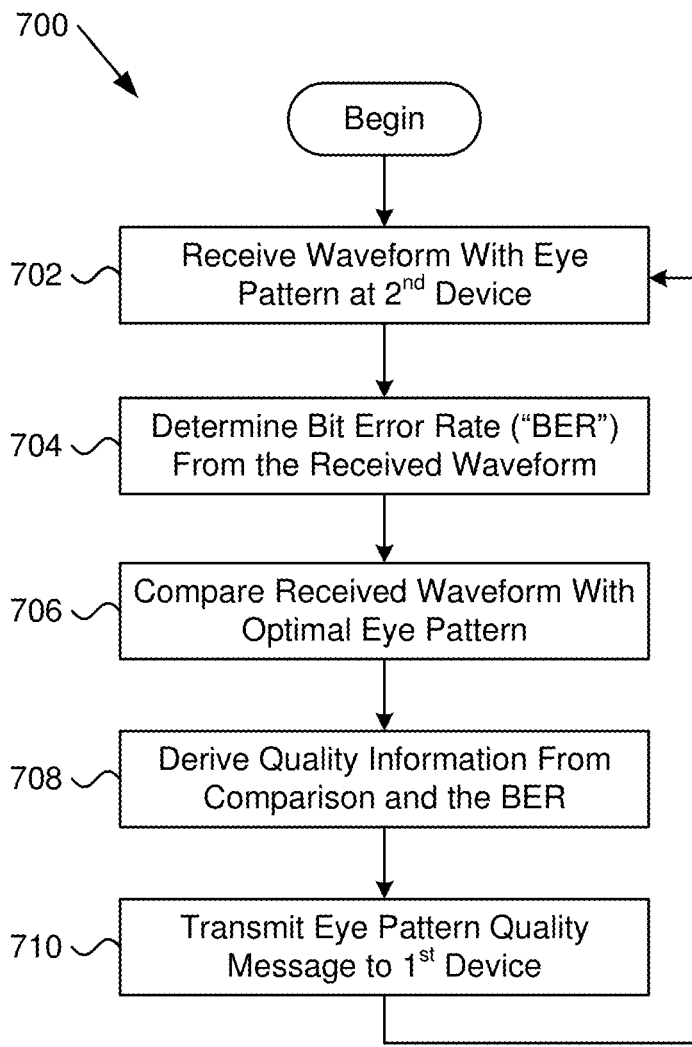
FIG. 7 is a schematic flow chart diagram illustrating a method for determining quality information, at a second computing device, of a waveform with an eye pattern received from a first computing device connected with a cable with a transceiver at each end and sending an eye pattern quality message to the first computing device, according to various embodiments.

FIG. 7 is a schematic flow chart diagram illustrating a method 700 for determining quality information, at a second computing device 304, of a waveform with an eye pattern received from a first computing device 302 connected with a cable 110 with a transceiver 112 at each end and sending an eye pattern quality message to the first computing device 302, according to various embodiments. The method 700 begins and receives 702, at a second computing device 304, a waveform with an eye pattern transmitted from a first computing device 302. The first computing device 302 is connected to the second computing device 304 with a cable 110 with a transceiver 112 at each end of the cable 110. The received waveform is in response to the first computing device 302 transmitting an eye pattern bit sequence in response to establishing a communication link between the first and second computing devices 302, 304.

The method 700 determines 704 a bit error rate ("BER") from the received waveform and compares 706 the received waveform with an optimal eye pattern. In some embodiments, the method 700 obtains the optimal eye pattern before comparing 706 the received waveform with the optimal eye pattern. The method 700 derives 708 quality information from the comparison of the received waveform with the optimal eye pattern and the determined BER and transmits 710 an eye pattern quality message to the first computing device 302 using a device discovery protocol and returns to receive 702 another waveform with an eye pattern from the first computing device 302. The eye pattern quality message includes the quality information. The first computing device 302 adjusts transmission parameters in response to the eye pattern quality message and retransmits an eye pattern bit sequence to the second computing device 304. In various embodiments, all or a portion of the method 700 is implemented using the eye pattern receiver 314, the BER module 316, the comparison module 318, the analysis module 320, the quality message transmitter 322, and/or the optimal eye module 410.

Embodiments may be practiced in other specific forms. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A method comprising:
receiving, at a second computing device, a waveform comprising an eye pattern transmitted from a first computing device, the first computing device connected to the second computing device with a cable comprising a transceiver at each end of the cable, wherein the received waveform is in response to the first computing device transmitting an eye pattern bit sequence in response to establishing a communication link between the first and second computing devices;
determining a bit error rate ("BER") from the received waveform;
comparing the received waveform with an optimal eye pattern;
deriving quality information from the comparison of the received waveform with the optimal eye pattern and the determined BER; and
transmitting an eye pattern quality message to the first computing device using a device discovery protocol, the eye pattern quality message comprising the quality information, wherein the first computing device adjusts transmission parameters in response to the eye pattern quality message and retransmits an eye pattern bit sequence to the second computing device.

2. The method of claim 1, further comprising, for each waveform comprising an eye pattern received from the first computing device:
comparing the received waveform with the optimal eye pattern;
deriving quality information from the comparison of the received waveform with the optimal eye pattern; and
transmitting to the first computing device an eye pattern quality message with the derived quality information, wherein the first computing device continues to adjust the transmission parameters and retransmits the eye pattern bit sequence until a received eye pattern quality message indicates that a received eye pattern is within an acceptable tolerance of an optimal eye pattern.

3. The method of claim 1, wherein transmission parameters used by the first computing device to transmit the eye pattern bit sequence in response to establishing the link comprise default transmission parameters based on manufacturer supplied data corresponding to the cable.

4. The method of claim 1, wherein deriving quality information from the comparison of the received waveform with the optimal eye pattern comprises determining differences between a plurality of quality parameters of the waveform and the optimal eye pattern and wherein the quality information comprises a value for each of the plurality of quality parameters.

5. The method of claim 1, wherein the cable comprises one of a copper direct attach cable ("DAC") and an active optical cable ("AOC") and wherein the device discovery protocol comprises a link layer discovery protocol ("LLDP").

6. The method of claim 1, further comprising, at the first computing device:
transmitting, in response to establishing a link, the eye pattern bit sequence from the first computing device to the second computing device over the cable comprising the transceiver connected to each end of the cable, wherein establishing the link comprises establishing a communication link over the cable between the first computing device and the second computing device;
receiving the eye pattern quality message from the second computing device using a device discovery protocol;
adjusting transmission parameters for transmission over the cable in response to the quality information; and
retransmitting the eye pattern bit sequence using the adjusted transmission parameters.

7. The method of claim 6, further comprising, at the first computing device, repeating receiving an eye pattern quality message, adjusting the transmission parameters and retransmitting the eye pattern bit sequence until the eye pattern quality message indicates an eye pattern received by the second computing device is within an acceptable tolerance of an optimal eye pattern in response to transmission of the eye pattern bit sequence.

8. The method of claim 7, further comprising, at the first computing device, transmitting a link up completion message in response to the eye pattern quality message indicating the received eye pattern is within an acceptable tolerance of the optimal eye pattern.

9. An apparatus comprising:
an eye pattern receiver configured to receive, at a second computing device, a waveform comprising an eye pattern transmitted from a first computing device, the first computing device connected to the second computing device with a cable comprising a transceiver at each end of the cable, wherein the received waveform is in response to the first computing device transmitting an eye pattern bit sequence in response to establishing a communication link between the first and second computing devices;
a BER module configured to determine a bit error rate ("BER") from the received waveform;
a comparison module configured to compare the received waveform with an optimal eye pattern;

an analysis module configured to derive quality information from the comparison of the received waveform with the optimal eye pattern and the determined BER; and a quality message transmitter configure to transmit an eye pattern quality message to the first computing device using a device discovery protocol, the eye pattern quality message comprising the quality information, wherein the first computing device adjusts transmission parameters in response to the eye pattern quality message and retransmits an eye pattern bit sequence to the second computing device.

10. The apparatus of claim 9, further comprising an optimal eye module configured to obtain an optimal eye pattern applicable to the received waveform.

11. The apparatus of claim 10, wherein the optimal eye module is configured to obtain the optimal eye pattern from one of a library and a manufacturer's database.

12. The apparatus of claim 9, further comprising, for each waveform comprising an eye pattern received from the first computing device by the eye pattern receiver:

determining, using the BER module, a BER from the received waveform comparing, using the comparison module, the received waveform with the optimal eye pattern;

deriving, using the analysis module, quality information from the comparison of the received waveform with the optimal eye pattern; and transmitting to the first computing device, using the quality message transmitter, an eye pattern quality message with the derived quality information, wherein the first computing device continues to adjust the transmission parameters and retransmits the eye pattern bit sequence until a received eye pattern quality message indicates that a received eye pattern is within an acceptable tolerance of an optimal eye pattern.

13. The apparatus of claim 9, wherein transmission parameters used by the first computing device to transmit the eye pattern bit sequence in response to establishing the link comprise default transmission parameters based on manufacturer supplied data corresponding to the cable.

14. The apparatus of claim 9, wherein the analysis module deriving quality information from the comparison of the received waveform with the optimal eye pattern comprises determining differences between a plurality of quality parameters of the waveform and the optimal eye pattern and wherein the quality information comprises a value for each of the plurality of quality parameters.

15. The apparatus of claim 9, wherein the cable comprises one of a copper direct attach cable ("DAC") and an active optical cable ("AOC") and wherein the device discovery protocol comprises a link layer discovery protocol ("LLDP").

16. The apparatus of claim 9, further comprising, at the first computing device:

an eye pattern transmitter configured to transmit, in response to establishing the link, the eye pattern bit sequence from the first computing device to the second computing device over the cable, wherein establishing the link comprises a communication link module establishing the communication link over the cable between the first computing device and the second computing device;

a quality message module configured to receive the eye pattern quality message from the second computing device using a device discovery protocol;

an adjustment module configured to adjust transmission parameters for transmission over the cable in response to the quality information; and the eye pattern transmitter is further configured to retransmit the eye pattern bit sequence using the adjusted transmission parameters.

17. The apparatus of claim 16, wherein the quality message module continues to receive eye pattern quality messages, the adjustment module continues to adjust the transmission parameters from quality information from a most recently received eye pattern quality message, and the eye pattern transmission continues to retransmit the eye pattern bit sequence using the adjusted transmission parameters until a received eye pattern quality message indicates that a received eye pattern is within an acceptable tolerance of an optimal eye pattern.

18. A system comprising:

a first computing device;

a second computing device;

a cable between the first computing device and the second computing device, the cable comprising a transceiver at each end;

an eye pattern transmitter configured to transmit, in response to establishing a link, an eye pattern bit sequence from the first computing device to the second computing device over the cable, wherein establishing the link comprises a communication link module establishing a communication link over the cable between the first computing device and the second computing device;

an eye pattern receiver configured to receive, at the second computing device, a waveform comprising the eye pattern bit sequence transmitted from the first computing device;

a BER module configured to determine a bit error rate ("BER") from the received waveform;

a comparison module configured to compare the received waveform with an optimal eye pattern;

an analysis module configured to derive quality information from the comparison of the received waveform with the optimal eye pattern and the determined BER;

a quality message transmitter configure to transmit an eye pattern quality message to the first computing device using a device discovery protocol, the eye pattern quality message comprising the quality information;

a quality message module configured to receive the eye pattern quality message from the second computing device using a device discovery protocol;

an adjustment module configured to adjust transmission parameters for transmission over the cable in response to the quality information; and the eye pattern transmitter is further configured to retransmit the eye pattern bit sequence using the adjusted transmission parameters, wherein the quality message module continues to receive eye pattern quality messages, the adjustment module continues to adjust the transmission parameters from quality information from a most recently received eye pattern quality message, and the eye pattern transmission continues to retransmit the eye pattern bit sequence using the adjusted transmission parameters until a received eye pattern quality message indicates that a received eye pattern is within an acceptable tolerance of an optimal eye pattern.

19. The system of claim 18, further comprising an optimal eye module configured to obtain, at the second computing device, an optimal eye pattern applicable to the received waveform.

20. The system of claim 18, wherein the cable comprises one of a copper direct attach cable ("DAC") and an active optical cable ("AOC") and wherein the device discovery protocol comprises a link layer discovery protocol ("LLDP").

\*   \*   \*   \*   \*